Jan. 22, 1963 J. R. MUMMERT 3,074,561
FILTERING MECHANISM
Filed Dec. 2, 1957 5 Sheets-Sheet 1

INVENTOR.
JOHN R. MUMMERT,
BY
Harold B. Hood
ATTORNEY.

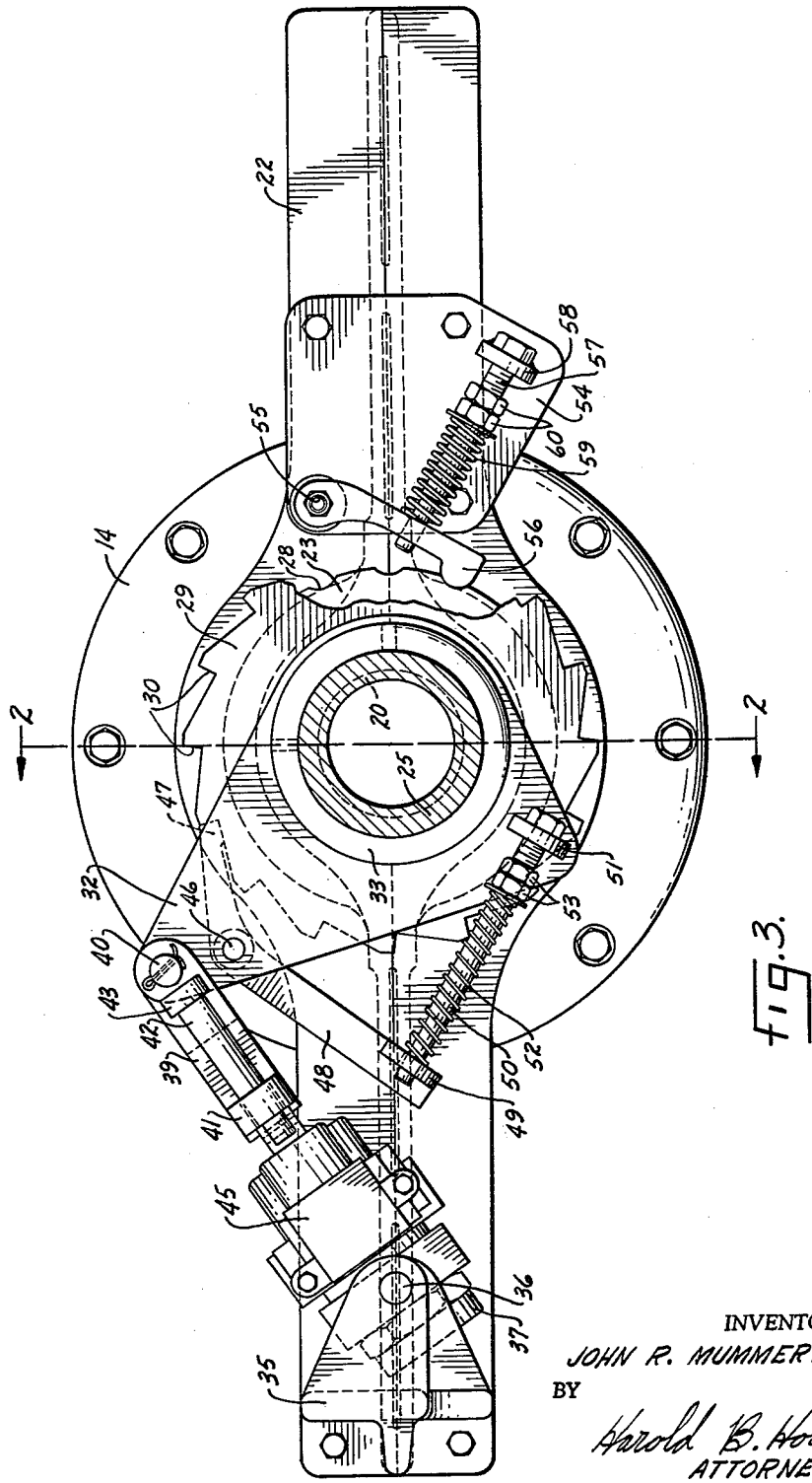

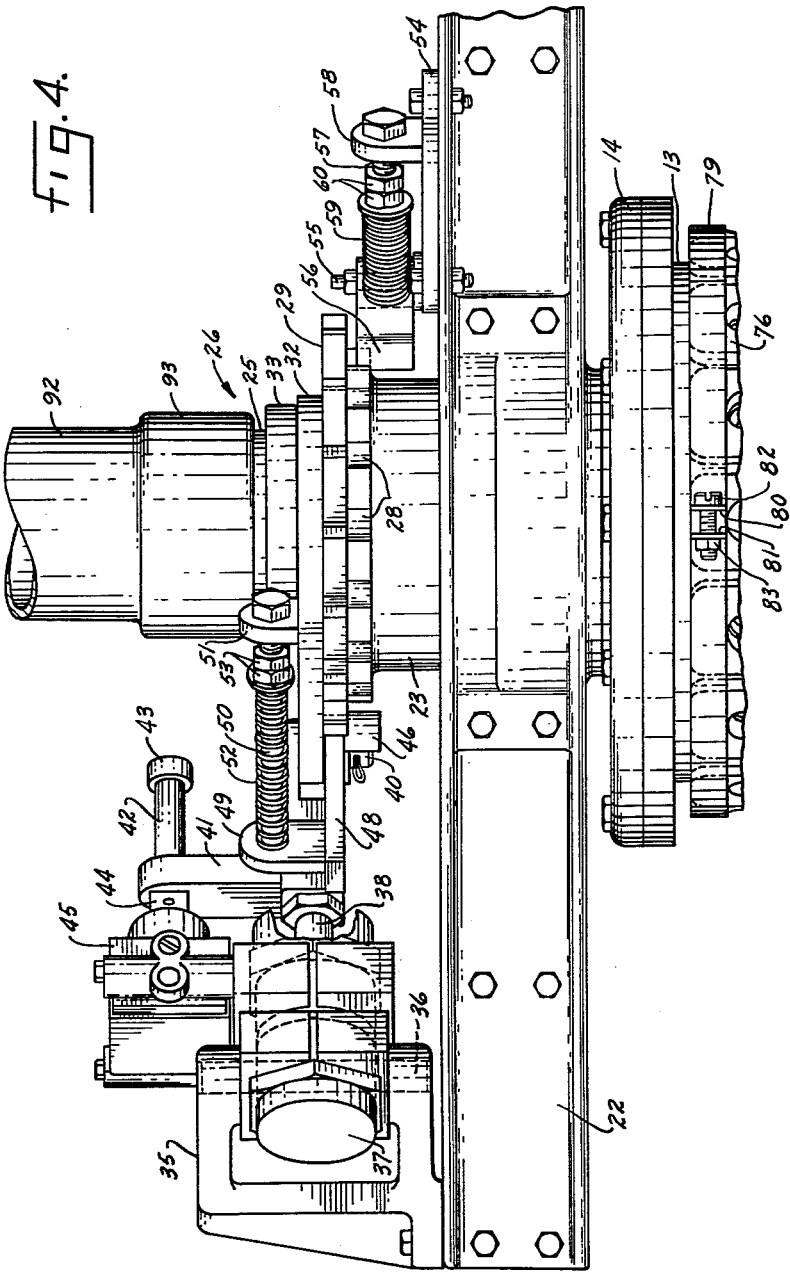

Jan. 22, 1963 J. R. MUMMERT 3,074,561
FILTERING MECHANISM
Filed Dec. 2, 1957 5 Sheets-Sheet 5
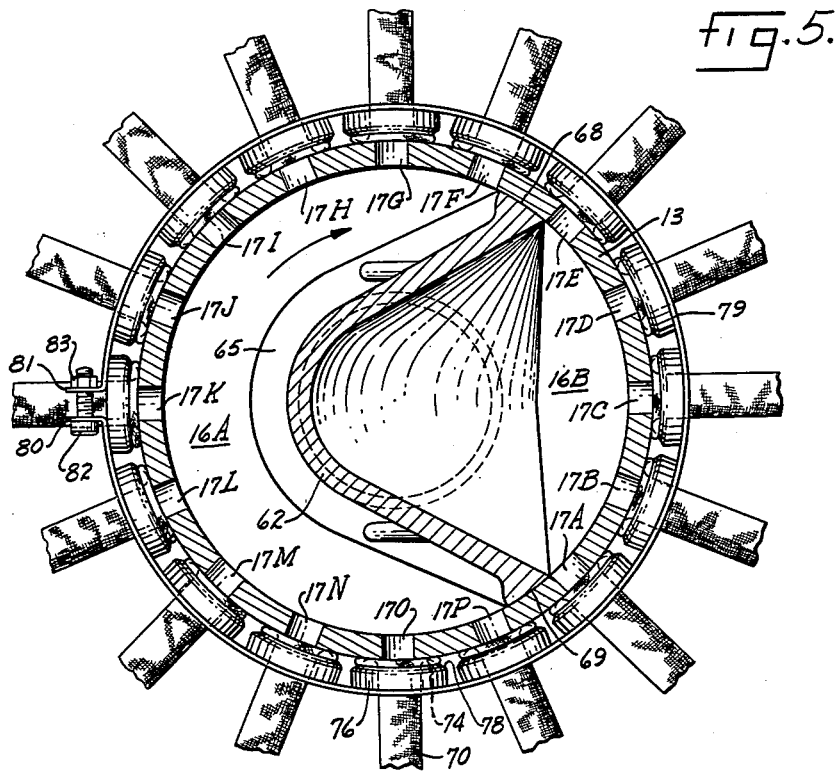
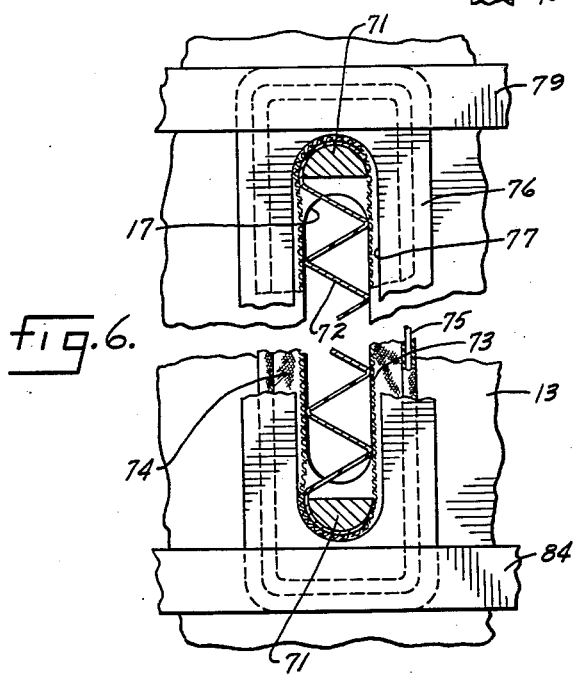
INVENTOR.
JOHN R. MUMMERT,
BY
Harold B. Hood
ATTORNEY.

United States Patent Office 3,074,561
Patented Jan. 22, 1963

3,074,561
FILTERING MECHANISM
John R. Mummert, Indianapolis, Ind., assignor to Merz Engineering, Inc., Indianapolis, Ind., a corporation of Indiana
Filed Dec. 2, 1957, Ser. No. 700,105
12 Claims. (Cl. 210—333)

The present invention relates to filtering mechanism, and is primarily concerned with the provision of mechanism for carrying on a continuous, self-cleaning filtering operation for the separation of solids from fluids in which they may be suspended, utilizing to that end a plurality of substantially identical filter units together with means for reversing the flow of fluid through such filter units in accordance with a predetermined schedule. The primary object of the invention, then, is to provide, in such a system, mechanism whereby, after solid-laden fluid has flowed in one direction through certain of such filter units whereby a cake has been deposited upon a surface of such units, clean fluid may be caused to flow in the opposite direction through such units to dislodge the cake therefrom and to prepare such filter units for further filtering action upon reestablishment of fluid flow therethrough in the original direction.

In the optimum form of the present invention, an object is to provide, in such a mechanism, means whereby the velocity of fluid flow in a filter-unit-cleaning direction will exceed the velocity of flow in a fluid-filtering direction. A still further object is to provide means whereby flow-reversal, to either direction, will be impressed upon one filter unit at a time. A still further object is to provide, in such a mechanism, flow-reversal means whereby filter-cleaning flow will be continuously impressed upon a plurality of filter units in the bank, while a larger plurality of such units are performing a fluid-filtering function.

A further object of the invention is to provide improved flow-reversal means, associated with a bank of filter units arranged in an annular, radiating series, said flow-reversing means being effective to dislodge the major portion of the cake which has formed on any filter unit, at a point spaced a substantial distance from the location of a newly-cleaned filter unit just returning to fluid-filtering operation, whereby to guard against the attraction of substantial masses of such dislodged material to the newly cleaned filter unit.

A further object of the invention is to provide novel and improved means for facilitating replacement of filter elements in such a mechanism.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 3 is a plan view taken substantially on the line 3—3 of FIG. 2;

FIG. 4 is a broken, side elevation of the mechanism of FIG. 2 and looking from the left of FIG. 2;

FIG. 5 is a section taken substantially on the line 5—5 of FIG. 2; and

FIG. 6 is a fragmentary section taken substantially on the line 6—6 of FIG. 2.

Figure 1:
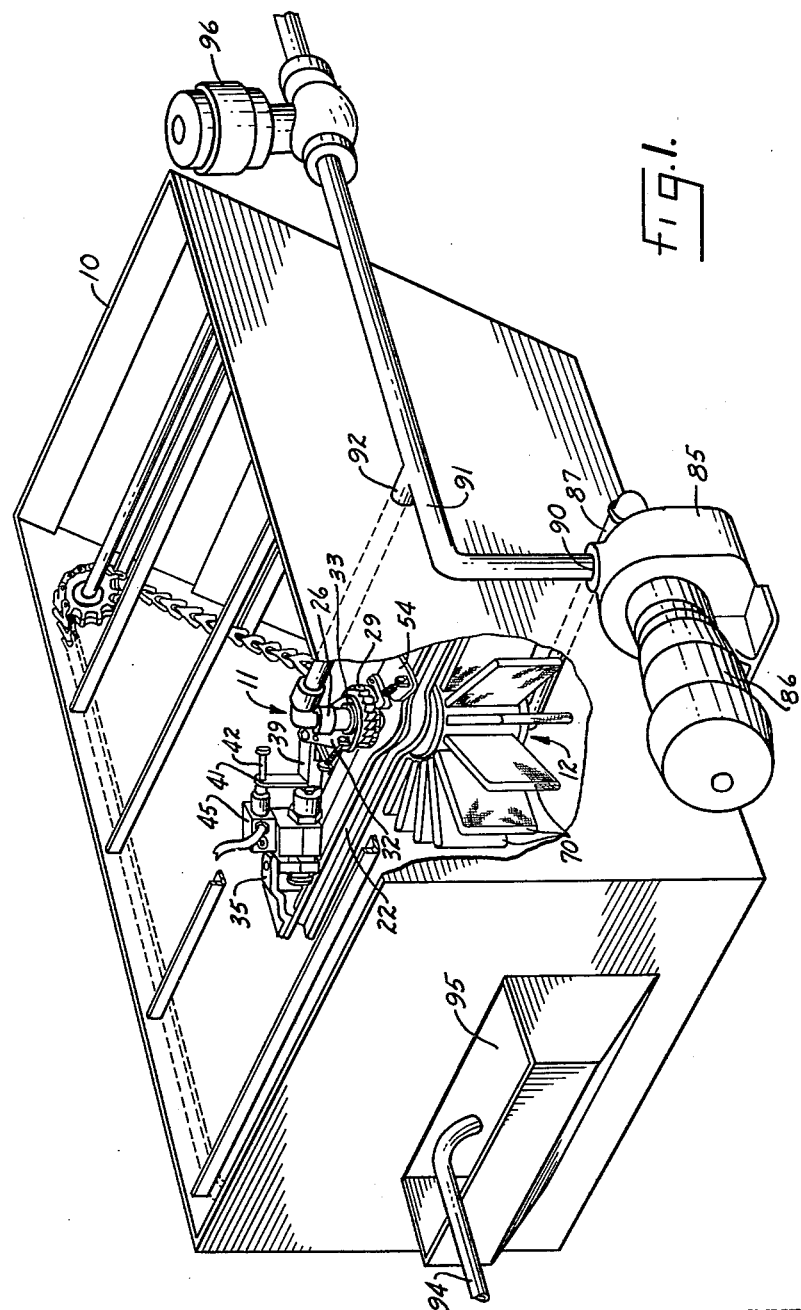
FIG. 1 is a broken perspective view of a filtering system constructed in accordance with the present invention.

Although it is capable of use in other environments, the filtering mechanism of the present disclosure finds its primary utility in a system for continuously furnishing coolant liquid to a machine tool, or the like; and it has been illustrated, and will be described, in that environment. Thus, in FIG. 1, I have illustrated a sedimentation tank 10 of conventional construction, my filtering mechanism, indicated generally by the reference numeral 11, being shown supported within the tank and including a filter bank, indicated generally by the reference numeral 12, immersed in the liquid (not shown) normally maintained in the tank. Ordinarily, the filter bank will be fully submerged in such liquid.

Figure 2:
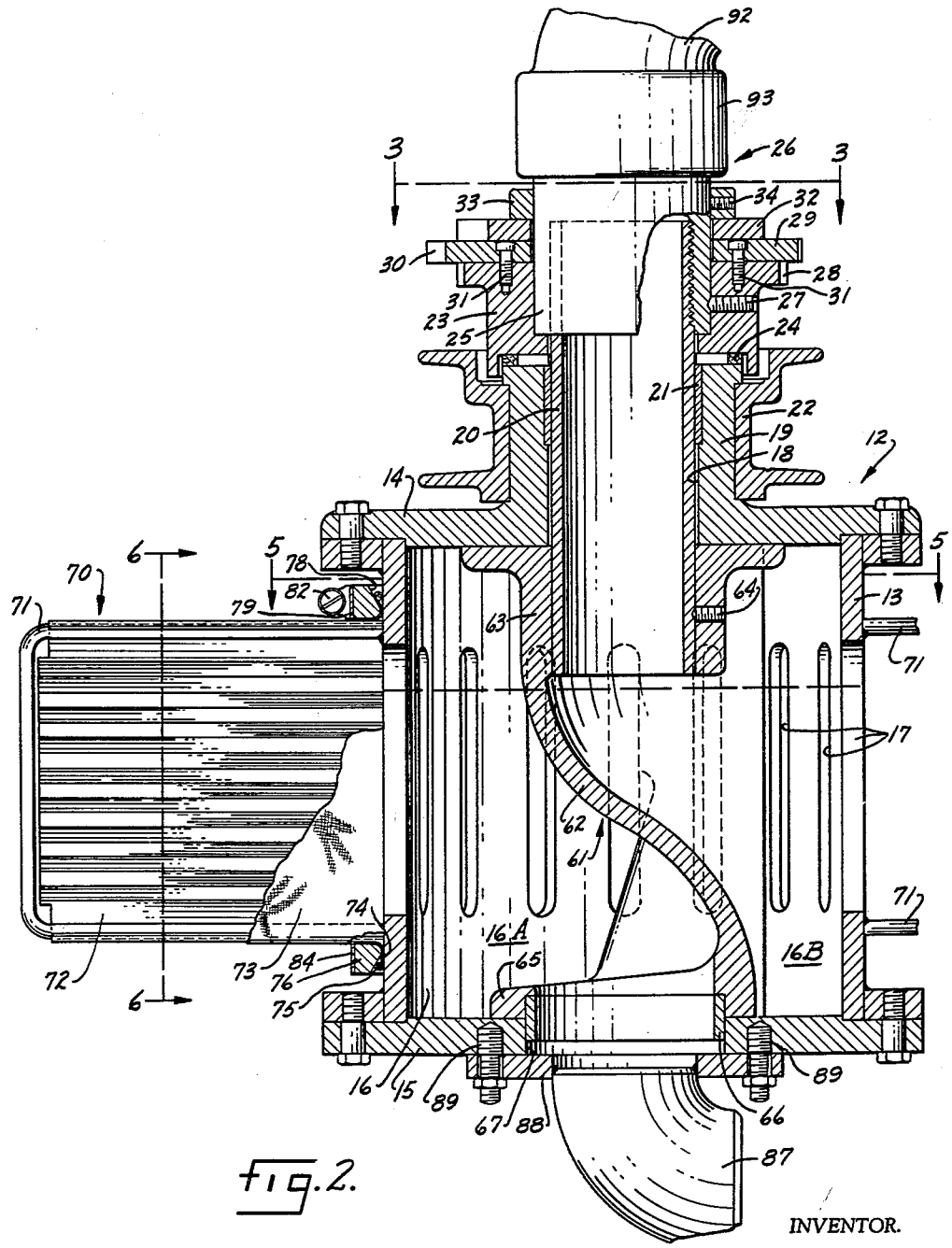
FIG. 2 is a vertical section, drawn to an enlarged scale and taken substantially on the line 2—2 of FIG. 3, of the filtering mechanism forming a part of the present invention.

Referring to FIG. 2, it will be seen that I have shown a substantially cylindrical wall 13 having upper and lower heads 14 and 15 secured to its opposite ends to define a chamber 16. Said wall 13 is formed with a plurality of peripherally-spaced ports 17 therethrough; and preferably said ports will be axially elongated, peripherally narrow and equiangularly spaced about the perimeter of the wall 13.

The head 14 is formed with a port 18 which is preferably coaxial with the chamber 16 and which is surrounded by an axially-outwardly extending neck 19. Extending through the bore 18 is a tubular member 20 which is journalled in a suitable bushing 21 mounted in the neck 19, for rotation upon the axis of the chamber 16, said tubular member extending downwardly into the chamber 16 and upwardly beyond the neck 19. The filter bank 12 is supported by clamping engagement of the neck 19 in a split beam 22, as is most clearly illustrated in FIGS. 1, 2 and 3.

Supported for rotation upon bearing-gasket means 24 on the upper end of the neck 19 is a collar 23 which is fixed to one element 25 of a tubular swivel joint indicated by the reference numeral 26, by means of a set screw 27, or the like; and the upper end of the tubular member 20 is threadedly engaged in said member 25 to rotate therewith. The collar 23 is provided with a radial flange at its upper end, the peripheral edge of said flange being formed with a series of notches 28 for a purpose later to become apparent.

A ratchet wheel 29 having a peripheral series of one-way teeth 30 (FIGS. 2 and 3) is fixed to the collar 23 by any suitable means such as, for instance, the screws 31. Supported upon the upper surface of the ratchet wheel 29 and journalled for oscillation about the axis of the member 25 is a pawl carrier 32, held against upward movement relative to the member 25 by a collar 33 fixed to said member 25 as, for instance, by set screw 34.

As is most clearly illustrated in FIGS. 3 and 4, a bracket 35 is supported from the beam 22 and mounts a trunnion pin 36 upon which is swivelly supported a reciprocating motor 37 having a plunger stem 38. In the illustrated embodiment of the invention, the motor 37 is a pneumatic motor, but it will be understood that other types of motors may be used in place thereof. An extension 39 on the plunger 38 has its distal end bifurcated to straddle a radially-projecting arm of the pawl carrier 32 and is operatively connected thereto by a pivot pin 40 whereby reciprocation of said plunger will cause oscillation of the pawl carrier 32 about the axis of the chamber 16. An upstanding lug 41 fixed to move with the extension 39 is perforated to slide upon a pin 42 having spaced abutments 43 and 44 thereon, said pin 42 constituting the shifting element for reversing valve mechanism of conventional construction indicated at 45 whereby, when the lug 41 engages the abutment 43 on completion of the outward stroke of the plunger 38, it will actuate valve mechanism 45 to permit return of the plunger; and the pin 42 will be returned to its initial position when the lug, upon the return stroke of the plunger 38, strikes the abutment 44.

A pivot pin 46, depending from the carrier 32, supports a pawl in the plane of the ratchet wheel 29, said pawl having a finger 47 engageable with the teeth 30 of said ratchet wheel. The opposite arm 48 of said pawl carries a perforated lug 49 in which is received the distal end of a rod 50 supported in a stationary lug 51 carried by the carrier 32; and a coiled spring 52 is sleeved on said rod and is confined between the lug 49 and a pair of adjusting screws 53 to urge the pawl resiliently in a clockwise direction about its mounting pin 46.

A pad 54 is supported upon the beam 22 near the member 25 and carries a pivot 55 upon which is oscillably supported, in the plane of the notched flange of the collar 23, a detent 56 engageable in the notches 28 of said flange. Said detent is apertured to receive the end of a rod 57 supported from a lug 58 on the pad 54, and a coiled spring 59 is sleeved on said rod and is confined between the detent 56 and a pair of adjusting nuts 60 to urge said detent resiliently into engagement with said notched flange.

Obviously, when the motor 37 is actuated to project the plunger 38, the pawl carrier 32 will be moved in a clockwise direction as viewed in FIG. 3 and, since the finger 47 is engaged with the radial face of a tooth 30, the ratchet wheel 29 will be correspondingly turned. When the lug 41 strikes the abutment 43, the rod 42 will be actuated to permit the retraction of the plunger 38 to carry the carrier 32 in a counter clockwise direction substantially to its illustrated position. During this movement, the finger 47 will ride the cammed surface of a tooth 30 (counterclockwise movement of the ratchet wheel and the member 23 being restrained by engagement of the detent 56 in a notch 28) until the finger 47 drops off the sharp edge of such tooth in preparation for the next projection of the plunger 38.

A valve is indicated generally by the reference numeral 61 in FIG. 2. Said valve comprises a generally axially-extending partition 62 which terminates at its upper end in a collar 63 fixed to the tubular element 20 as, for instance, by a set screw 64. At its lower end, the partition terminates in a collar 65 journal-supported upon a bushing 66 mounted in a port 67 in the head 15 coaxial with the chamber 16. It will be seen that the valve 61 is thus arranged for rotation with the tubular member 20 and that its partition effectively divides the chamber 16 into sections 16A and 16B. As is most clearly shown in FIG. 5 the lateral edges 68 and 69 of the partition 62 sealingly engage the internal surface of the wall 13, and the valve is so shaped that, in the illustrated embodiment of the invention in which there are sixteen ports in the wall 13, only five of those ports are open, at any one time, to the chamber 16B, while eleven of those ports are concurrently open to the chamber 16A. While this specific ratio is deemed optimum, it is not critical, the only requirement being that a plurality of ports shall always be open to the chamber section 16B and that a significantly greater number of ports shall always be open to the chamber section 16A.

A filter unit, indicated generally by the reference numeral 70 (FIGS. 2 and 6) is provided for each of the ports 17. Each such filter unit comprises a filter frame made up of a U-shaped bar 71 of substantial rigidity welded or otherwise suitably secured to the external surface of the wall 13 and a corrugated plate 72 supported to span the legs of said bar. The plate 72 may be foraminous, but need not be.

Removably sleeved upon each such frame is a filter bag 73 which is formed of foraminous material and preferably of material which is readily flexible. The bag 73 is proportioned and designed to be loosely sleeved upon its frame to envelop the same, and is closed except for an open mouth at that end of the bag which, when the bag is in operative position, is adjacent the wall 13. The bag mouth is defined by an outturned lip 74 to the external rim of which is suitably secured an anchor ring 75. As is most clearly shown in FIG. 6, the dimensions of the ring 75 substantially exceed those of the port 17, so that said port is enveloped by the bag mouth and the interior of the bag is in open communication with the chamber 16 through its port 17.

The ring 75 not only facilitates the step of sleeving the bag onto the frame but also provides means which is readily engageable to secure the bag mouth lip in firmly-pressed engagement with the external surface of the wall 13 to guard against leakage past the filter bag. For exerting such pressure I provide, for each filter bag, a guard ring 76 most clearly illustrated in FIGS. 2, 4, 5 and 6. The internal diametrical dimensions of the guard ring, indicated at 77, somewhat exceed those of the associated port 17 and approximate those of the associated filter frame. That axial surface 78 of the guard ring 76 which is to face the wall 13 when the ring is installed is inclined outwardly and away from said wall so that, when the guard ring is slipped over a bag 73 and is pressed toward the wall 13, the surface 78 will engage the anchor ring 75 with a camming action tending to expand the anchor ring and thus to stretch the lip 74.

Means is provided for exerting a radial inward pressure upon the guard ring 76; and, in the illustrated form of the invention, such means is shown as a strap 79 surrounding the assembly, engaging the upper ends of all of the guard rings 76, and having its opposite ends bent outwardly as at 80 and 81 (FIGS. 4 and 5). A bolt 82 is passed through registering openings in the outturned ends 80 and 81 and a nut 83, threaded on said bolt, is manipulatable to draw said outturned ends of said strap toward each other, thereby tensioning the strap. A similar strap 84 surrounds the assembly and engages the lower ends of all of the guard rings 76 in a similar manner.

It will be apparent that, when a set of bags 73 has become worn or otherwise unfit for further service, the two straps 79 and 84 may be removed, whereafter all of the guard rings 76 will be removed, the several bags 73 will be removed and discarded, and a new set of bags may be sleeved on the several frames and secured in place by their guard rings and the straps 79 and 84 with great facility.

In the system, as illustrated, a pump 85 driven by a motor 86 or other suitable source of power is mounted outside the tank 10. The pump intake is connected, by conduit means 87, to the port 67 in the head 15 in any suitable manner. As shown in FIG. 2, a ring 88 is welded to the adjacent end of the conduit means 87 and is secured to the head 15, in registration with the port 67, by means of screws 89 and cooperating nuts, or the like. Whatever the securing means, it will be seen that the conduit means is thus placed in continuous, open communication with the chamber section 16A through the bushing 66 and the lower collar 65 of the valve means 61.

Referring back to FIG. 1, it will be seen that the pump outlet 90 has other conduit means 91 connected thereto, the conduit means 91 leading, through suitable valving means 96, to a point of use (not shown). A branch conduit 92 leads from the conduit means 91, between the pump outlet 90 and the valving means 96, to the other element 93 of the swivel coupling 26 (see FIGS. 2 and 4). Thus, the branch conduit means 92 is always in open communication with the chamber section 16B through the swivel coupling 26, the tubular member 20 and the upper collar 63 of the valve means 61. A return conduit 94 leads from the above-named point of use to discharge, as shown in FIG. 1, into a return trough 95 communicating with the interior of the tank 10.

When the illustrated system is in operation, the pump 85 will be continuously operated to create a pressure difference between the chamber sections 16A and 16B. Assuming that the tank 10 is open, as shown, of course the pressure in the chamber section 16A will be subatmospheric, and the pressure maintained in the chamber section 16B will exceed the pressure impressed on the exteriors of the filter units 70 by the atmosphere and by any liquid head which may exist in the tank.

The capacity of the pump 85 is so related to the current setting of the valve mechanism 96 that approximately one-half of the total volume of liquid delivered by the pump will pass the valve mechanism 96 to flow to the point of use and thence to be returned to the tank, while the other half of that volume will be delivered through the branch conduit means 92 to the chamber section 16B. Since the number of ports open to the chamber section 16B is substantially less than the number of ports open to the chamber section 16A, the liquid delivered to the chamber 16B will be ejected through the ports communicating with that chamber at relatively high velocity.

In the illustrated form of the system, the partition 62 is so proportioned and designed that, of the sixteen ports in the wall 13, five ports, indicated respectively by the reference characters 17A, 17B, 17C, 17D and 17E are open to the chamber section 16B. Assuming that the valve 61 rotates in a clockwise direction, as indicated by the arrow in FIG. 5, it will be appreciated that the port 17A has just been brought into communication with the chamber section 16B, while the ports 17B, 17C, 17D and 17E have been in such communication for progressively longer periods. It will also be recognized that the port 17F has just been brought into communication with the chamber section 16A, while the ports 17G, 17H, 17I, 17J, 17K, 17L, 17M, 17N, 17O and 17P have been in communication with the chamber section 16A for progressively longer periods. Thus, the filter unit associated with port 17F is completely clear of cake and is just beginning to act to filter solids from the liquid drawn through that unit into the chamber section 16A, while the filter unit associated with the port 17P has been acting so to filter liquid for a relatively long period and has accumulated a relatively heavy cake.

As the valve 61 moved to its illustrated position, the drection of fluid flow through the port 17A was reversed. Since the bag 73 is flexible and relatively loose, it tends to hug the frame 71 and the corrugated plate 72 during filtering action, when the pressure inside the filter unit is less than the pressure outside the filter unit; and as the direction of fluid flow reverses, the bag 73 will tend to belly outwardly. Such flexure of the bag, of course, acts mechanically to tend to crack or rupture the cake which has formed on the outside of the bag, therefore facilitating dislodgment of the cake, in relatively large pieces, as liquid begins to flow outwardly from the chamber section 16B through the port 17A. Thus, most of the cake falls promptly away from the filter unit associated with the port 17A and, being in relatively large, dense pieces, tends to settle quickly to the bottom of the tank.

It is important to note that, because of the design of the mechanism herein disclosed, the clean filter unit associated with the port 17F which has just been brought into filtering operation, is physically separated from the filter unit associated with the port 17A by a substantial distance, whereby the filter unit associated with the port 17F is to a substantial extent guarded against early clogging by particles dislodged in heavy concentration from the filter units associated with the ports 17A, 17B and 17C.

Obviously, since the port 17B and 17C have been in communication with the chamber section 16B for longer periods, the pores of the filter bags associated therewith have become less and less clogged with filtered solids. Therefore, liquid will flow at greater and greater volumes through the successive ports 17B, 17C, 17D and 17E, and the filter bag of the unit associated with the port 17E will be substantially completely cleared at the moment when the parts occupy the positions of FIG. 5.

Conversely, a that moment the filter unit associated with the port 17F will be substantially unclogged and liquid will flow through that filter unit at a maximum rate. The filter units associated with the ports 17G to 17P will be progressively more and more clogged—that is, the cake formed on the outside of such filter units will be progressively heavier and heavier whereby the rate of fluid flow therethrough will be progressively less and less so that the filter unit associated with the port 17F will be performing at maximum efficiency while the filter unit associated with the port 17P will be performing at minimum efficiency. Since the rate of fluid flow through the last-mentioned filter unit will be a minimum, the tendency of that filter unit to pick up particles dislodged from the filter unit associated with the port 17A will be minimized and will interfere with settling of the particles so dislodged to a minimum extent.

Through any suitable manual or automatic means, the motor 37 will be periodically actuated to project, and then to return, its plunger 38, thereby advancing the ratchet wheel 29 and the valve 61 through an angular step which, in the embodiment which now appears to me to be optimum, will have an angular extent substantially equal to the angular spacing between adjacent ports 17. Thereby the partition edge 69 will be moved to a position between the ports 17O and 17P and the partition edge 68 will be moved to a position between the ports 17D and 17E. In the new position of the valve 61, the filter unit associated with the port 17P will be affected in the manner above described with respect to the unit associated with the port 17A; the filter unit associated with the port 17E will be brought into filtering operation; and the filter units associated with the ports 17A, 17B, 17C and 17D will continue to be subjected to the cleaning effect of liquid flowing outwardly therethrough from the chamber section 16B.

It is to be noted that the liquid used for cleaning or backwashing the filter units is liquid which has already been filtered into the chamber 16A, which has been drawn therefrom through the conduit means 87 and which is ready for delivery to the point of use. A modicum of filtered liquid is diverted from its path to the point of use and is delivered, through the branch conduit means 92, to the chamber section 16B whence it flows outwardly to and through the filter units currently in communication with that chamber section to clean them.

While I presently believe that the illustrated relationship between the number of filter units currently communicating with the chamber section 16B and the number of filtering units currently communicating with the chamber section 16A is optimum, it will be obvious that, depending upon the characteristics of the fluid to be cleaned and the solids suspended therein, it may be desirable, in specific installations, to vary that relationship; and of course that can be done by suitably designing the valve means 61. The rate of movement of the valve means will also be selected in conformity with the conditions under which the filtering mechanism is operating. The specific mechanism herein illustrated can be adapted for use with fluids of various consistencies carrying various types and concentrations of solid materials in suspension by varying the rate at which the valve 61 is rotated. Such rate will be so selected that the cake accumulated on a filter unit just before that unit is brought into communication with the chamber section 16B will be almost heavy enough to stop flow through that unit into the chamber section 16A, and yet light enough so that, by the time the chamber section 16B has moved into and then out of communication with that filter unit, the pores of its filter bag will be substantially free of solids.

As a consequence of this relationship, the rate of flow of clean liquid through the pump 85 can be maintained constant through a wide range of rate of use of liquid at the point of use (not shown). Of course, when the system is operating at a normal rate of use of clean liquid at the point of use, one-half of the total volume of clean liquid will flow to the point of use and thence back to the tank, while the other half of that volume will circulate through the chamber section 16B. If the demand at the point of use is terminated while the pump 85 continues to operate, the backwash volume circulating through the chamber section 16B will be doubled.

I claim as my invention:

1. A filter assembly comprising an annular wall, a first head and a second head secured to the opposite ends of said wall to define therewith a chamber, said wall being formed with an equiangularly-spaced series of ports therethrough, a plurality of hollow filter units, one for each port, arranged in a radiating series externally of said wall with their proximal ends arranged for communication with said ports, respectively, each of said heads being formed with a port therethrough, axially-extending partition means arranged in said chamber and cooperating with said wall to divide said chamber into separate sections, one section being open to a plurality of said ports and to one only of said head ports and the other section being open to a larger number of said ports and to the other only of said head ports, and means for effecting relative rotational movement, about the axis of said annular wall, between said partition means and said filter units to bring successive ones of said units progressively out of communication with said one head port and into communication with said other head port and vice versa.

2. A filter assembly comprising an internally cylindrical wall, a first head and a second head secured to the opposite ends of said wall to define therewith a chamber, said wall being formed with an equiangularly-spaced series of ports therethrough, a hollow filter unit for each of said ports secured exteriorly to said wall, each such unit having its hollow interior in open communication with, and enveloping, the external mouth of its associated port, each of said heads being formed with an axial port therethrough, valve means mounted in said chamber for coaxial rotation therein, said valve means including axially-extending partition means cooperating with said wall and dividing said chamber into a first section open to one of said head ports only and a second section open to the other of said head ports only, and means for manipulating said valve means.

3. A filter assembly comprising an internally cylindrical wall, a first head and a second head secured to the opposite ends of said wall to define therewith a chamber, said wall being formed with an equiangularly-spaced series of ports therethrough, a hollow filter unit for each of said ports secured exteriorly to said wall, each such unit having its hollow interior in open communication with, and enveloping, the external mouth of its associated port, each of said heads being formed with an axial port therethrough, valve means mounted in said chamber for coaxial rotation therein, bearing means coaxial with one of said head ports, tubular means extending through the other of said head ports and mounted for rotation therein, said valve means including a partition terminating at one end in a collar journal-supported on said bearing means and terminating at its other end in a collar fixed to rotate with said tubular means, said partition cooperating with said wall and dividing said chamber into a first section open to one of said head ports only and a second section open to the other of said head ports only, and means for rotating said tubular means.

4. The assembly of claim 3 in which said last-named means comprises a toothed wheel fixed to said tubular means outside said chamber, a motor mounted adjacent said wheel, and means operatively connecting said motor to drive said wheel.

5. The assembly of claim 3 in which said last-named means comprises a ratchet wheel fixed to said tubular means outside said chamber, a reciprocating motor mounted adjacent said wheel, a pawl carrier mounted for oscillation about the axis of said wheel, a pawl mounted on said carrier in operative association with said ratchet wheel, and means connecting said motor to oscillate said carrier.

6. In a filtering mechanism, a housing defining a chamber formed, in its perimetral wall, with a plurality of perimetrally-spaced ports therethrough, a filter frame for each port externally secured to said wall in registry with its corresponding port, a filter bag for each frame proportioned and designed to slip over its corresponding frame and closed except for an open mouth at that end which, when said bag is in operative position, is disposed adjacent said wall, an anchor ring fixedly secured at the mouth of each bag and having diametrical dimensions exceeding the corresponding dimensions of the corresponding port, a guard ring for each bag having internal dimensions slightly exceeding the external transverse dimensions of the corresponding frame and less than those of the corresponding anchor ring, each guard ring fitting over the proximal end of its corresponding bag to bear against the anchor ring thereof, and perimetrally-extending means externally engaging all of said guard rings to press the anchor rings and bag mouths firmly against the external surface of said wall.

7. In a filtering mechanism, a housing defining a chamber formed, in its perimetral wall, with a plurality of perimetrally-spaced ports therethrough, a filter frame for each port externally secured to said wall in registry with its corresponding port, a filter bag for each frame proportioned and designed to slip over its corresponding frame and closed except for an open mouth at that end which, when said bag is in operative position, is disposed adjacent said wall, an anchor ring fixedly secured at the mouth of each bag and having diametrical dimensions exceeding the corresponding dimensions of the corresponding port, a guard ring for each bag having internal dimensions slightly exceeding the external transverse dimensions of the corresponding frame and less than those of the corresponding anchor ring, each guard ring fitting over the proximal end of its corresponding bag to bear against the anchor ring thereof, a first clamping means circumscribing said wall and externally engaging all of said guard rings, and a second clamping means circumscribing said wall and externally engaging all of said guard rings in a region spaced from the region engaged by said first clamping means, to press the anchor rings and bag mouths firmly against the external surface of said wall.

8. The mechanism of claim 7 in which each of said clamping means comprises a flexible strap and means for drawing together the ends of said strap.

9. In a filtering mechanism, a housing defining a chamber formed, in its perimetral wall, with a plurality of perimetrally spaced ports therethrough, a filter frame for each port externally secured to said walls in registry with its corresponding port, a filter bag for each frame proportioned and designed to slip over its corresponding frame and closed except for an open mouth at that end which, when said bag is in operative position, is disposed adjacent said wall, an anchor ring fixedly secured at the mouth of each bag and having diametrical dimensions exceeding the corresponding dimensions of the corresponding port, a guard ring for each bag having internal dimensions slightly exceeding the external transverse dimensions of the corresponding frame and less than those of the corresponding anchor ring, each guard ring fitting over the proximal end of its corresponding bag to bear against the anchor ring thereof, that face of each guard ring presented toward said wall being radially outwardly inclined away from said wall to define a cam surface tending, when said guard ring is urged toward said wall, to expand the corresponding anchor ring, and perimetrally-extending means externally engaging all of said guard rings to press the anchor rings and bag mouths firmly against the external surface of said wall.

10. In a filtering mechanism, a housing defining a chamber formed, in its perimetral wall, with a plurality of perimetrally-spaced ports therethrough, a filter frame for each port externally secured to said wall in registry with its corresponding port, a filter bag for each frame proportioned and designed to slip over its corresponding frame and closed except for an open mouth at that end which, when said bag is in operative position, is disposed adjacent said wall, an anchor ring fixedly secured at the mouth of each bag and having diametrical dimensions exceeding the corresponding dimensions of the corresponding port, a guard ring for each bag having internal dimensions slightly exceeding the external transverse dimensions of the corresponding frame and less than those of the corresponding anchor ring, each guard ring fitting over the proximal end of its corresponding bag to bear against the anchor ring thereof, that face of each guard ring presented toward said wall being radially outwardly inclined away from said wall to define a cam surface tending, when said guard ring is urged toward said wall, to expand the corresponding anchor ring, and means for urging said guard rings toward said wall.

11. In a filtering mechanism, a housing defining a chamber formed, in its perimetral wall, with a plurality of perimetrally-spaced ports therethrough, a filter frame for each port externally secured to said wall in registry with its corresponding port, a filter bag of readily-flexible, foraminous material loosely enveloping and supported upon each frame, whereby said bag is, to a significant extent, capable of expansion and contraction relative to said frame in response to reversal of a pressure difference between the interior and the exterior of said bag, each bag being closed except for an open mouth at that end which, when said bag is in operative position, is disposed adjacent said wall, an anchor ring fixedly secured at the mouth of each bag and having diametrical dimensions exceeding the corresponding dimensions of the corresponding port, a guard ring for each bag having internal dimensions slightly exceeding the external transverse dimensions of the corresponding frame and less than those of the corresponding anchor ring, each guard ring fitting over the proximal end of its corresponding bag to bear against the anchor ring thereof, and perimetrally-extending means externally engaging all of said guard rings to press the anchor rings and bag mouths firmly against the external surface of said wall.

12. In a filtering mechanism, a housing defining a chamber having inlet and outlet ports adjacent its axial ends, respectively, and formed, in its perimetral wall, with a plurality of perimetrally-spaced ports therethrough, a filter frame for each port externally secured to said wall in registry with its corresponding port, a filter bag for each frame proportioned and designed to slip over its corresponding frame and closed except for an open mouth at that end which, when said bag is in operative position, is disposed adjacent said wall, an anchor ring fixedly secured at the mouth of each bag and having diametrical dimensions exceeding the corresponding dimensions of the corresponding port, a guard ring for each bag having internal dimensions slightly exceeding the external transverse dimensions of the corresponding frame and less than those of the corresponding anchor ring, each guard ring fitting over the proximal end of its corresponding bag to bear against the anchor ring thereof, perimetrally-extending means externally engaging all of said guard rings to press the anchor rings and bag mouths firmly against the external surface of said wall, means mounted in said chamber and cooperative with said perimetral wall to connect certain of said perimetrally-spaced ports with said inlet port and others of said perimetrally-spaced ports with said outlet port, and means for moving said last-named means progressively within said chamber to alternate such connections.

References Cited in the file of this patent

UNITED STATES PATENTS

| | | |
|---|---|---|
| 1,945,839 | Vor Maltitz | Feb. 6, 1934 |
| 2,095,447 | Lentz | Oct. 12, 1937 |
| 2,173,978 | Pennebaker | Sept. 26, 1939 |
| 2,271,814 | Coolidge | Feb. 3, 1942 |
| 2,310,587 | MacNeil | Feb. 9, 1943 |
| 2,592,528 | Failmezger | Apr. 15, 1952 |
| 2,821,305 | Anderson | Jan. 28, 1958 |
| 2,834,474 | Jalkanen | May 13, 1958 |